Oct. 15, 1957    J. J. BIKERMAN    2,810,008
ELECTRODE FOR ELECTRIC BATTERIES
Filed Sept. 16, 1952
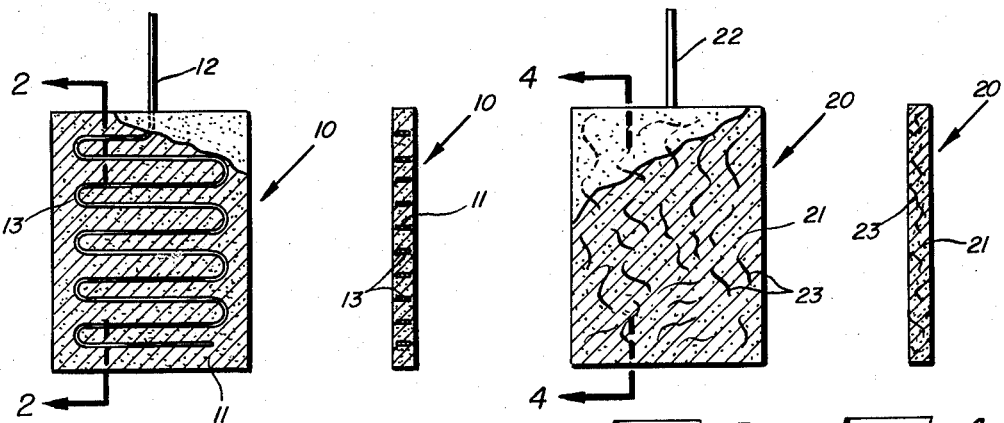
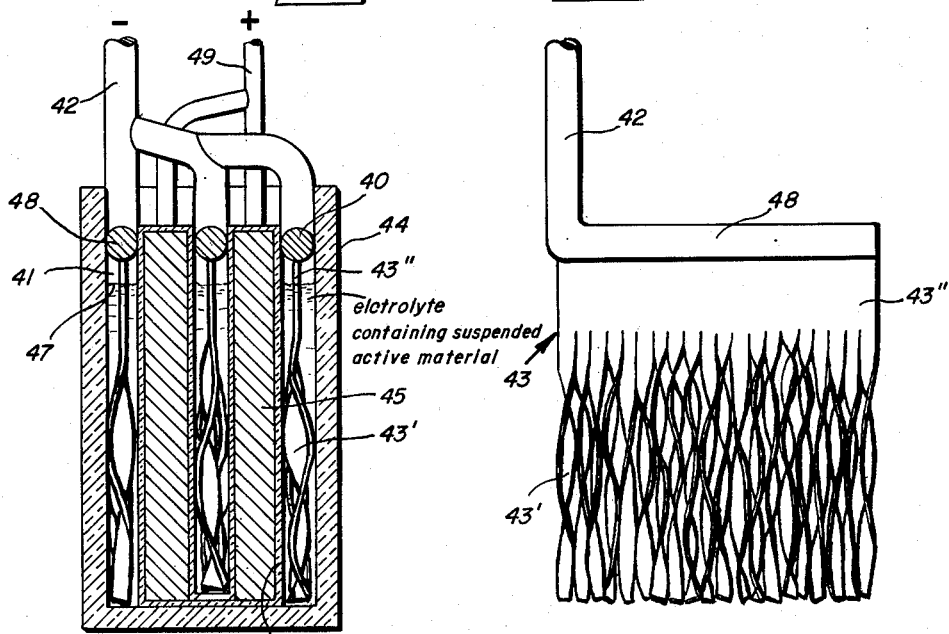
INVENTOR:
JACOB J. BIKERMAN
BY
Karl F. Ross
AGENT

United States Patent Office 2,810,008
Patented Oct. 15, 1957

2,810,008
ELECTRODE FOR ELECTRIC BATTERIES

Jacob J. Bikerman, Woodside, N. Y., assignor to Yardney International Corp., New York, N. Y., a corporation of New York Application September 16, 1952, Serial No. 309,829

4 Claims. (Cl. 136—125)

My present invention relates to electrodes for electric batteries, more particularly to negative electrodes for batteries (rechargeable or other) of the alkaline type.

In such batteries, which may comprise negative electrodes containing zinc and positive electrodes containing silver as disclosed, for example, in U. S. Patent No. 2,594,709, issued April 29, 1952 to Henri André, it has been found that the decrease in terminal voltage experienced during prolonged discharge is due chiefly to polarization of the negative electrode, whereas the voltage drop due to internal cell resistance and polarization of the positive electrode is only of subordinate importance. It is also known that this polarization is a function not of the absolute current but of the apparent current density at the electrode.

It is, accordingly, an important object of my present invention to provide means for reducing the apparent current density at the negative electrode (or electrodes) of a battery of the above-described type by increasing the effective surface of such electrode.

It has previously been proposed to incorporate current-distributing networks comprising filaments of highly conductive material in battery electrodes for the purpose of increasing their conductivity. The presence of the usual type of filament, which is generally a wire of more or less circular cross section, will not, however, materially increase the effective surface of the electrode so as to reduce the apparent current density thereat. A more specific object of my invention, therefore, is to provide a conductive structure adapted to serve both as a current-distributing network and as a means for increasing the effective electrode surface.

Still another object of my invention is to provide a conductive structure which, besides having the advantageous properties set forth above, will fulfill one or more of the following functions: (a) Provide a support for comminuted active material forming the electrode proper, so as to prevent said material from gravitating toward the bottom of the surrounding container; (b) form a resilient insert adapted to help maintain the electrode assembly with its inter-electrode separator (or separators) in compression, for reasons set forth in the above-identified André patent; (c) facilitate the controlled circulation of electrolyte in the vicinity of the electrode by forming a large number of channels through which the liquid may pass.

In accordance with this invention I have found that the above objects may be realized through the use of a conductive structure, as part of a battery electrode, comprising flat strips or ribbons of highly conductive metal, such as copper or silver turnings, the term "flat" denoting a large ratio of width to thickness corresponding to a favorable ratio of surface to volume.

It has been observed that batteries having negative electrodes incorporating structures of the character just described will manifest greatly improved performance particularly at low temperatures, e. g. at temperatures of −30° C. It is, accordingly, a further object of my present invention to provide a battery, of the general type outlined above, adapted specifically for use at temperatures substantialy below the freezing point of water.

The above and other objects, features and advantages of my invention will become more fully apparent from the following description of certain embodiments, reference being had to the accompanying drawing in which:

Fig. 1 is an elevational view, partly in section, of an electrode incorporating a structure according to the invention;

Fig. 2 is a section on the line 2—2 of Fig. 1;

Fig. 3 is a view similar to Fig. 1, showing a modified electrode according to the invention;

Fig. 4 is a section on the line 4—4 of Fig. 3;

Fig. 5 is a vertical section through a battery casing containing an electrode assembly which includes negative electrodes representing still another embodiment of the invention; and Fig. 6 is a side elevation of one of the negative electrodes of Fig. 5.

Referring first to Figs. 1 and 2, there is shown an electrode generally designated 10 and comprising a body 11 of compacted active material, e. g. zinc oxide, in powder form. A lead 12, emerging from the electrode body 11, is integral with the conductive structure 13 which in this embodiment comprises a flat strip of metal, such as copper, wound in serpentine turns so as to present a number of substantialy horizontal sections traversing the body 11 over a substantial portion of its thickness and width. It will be understood that the undulate structure 13, in addition to helping increase the effective surface of the electrode 10, by virtue of its horizontal strip sections serves as a means for supporting the active powder 11 so as to prevent the same from dropping to the bottom of the battery casing when the electrode 10 is immersed in the electrolyte. The thickness of the strip 13, which is a small fraction of its width, has been shown exaggerated for clarity's sake.

In the embodiment of Figs. 3 and 4 the single, wound strip 13 has been replaced by relatively short fragments 23 scattered in random fashion throughout the electrode body 21. It will be appreciated that these strip fragments, which may be metal turnings or shavings of copper, silver, magnesium or the like, will again contribute to the mechanical support of the zinc oxide particles 21, although possibly not quite as effectively as the undulate structure 13 of Figs. 1 and 2. It will further be understood that each of the ribbon-like fragments 23 repersents, in effect, a miniature spring adapted to resist torsional as well as flectional deformations; thus the electrode 20 will act as a resilient cushion or pad adapted to exert a certain pressure upon the inter-electrode separator material and to have some regulatory effect upon the pressure caused by the swelling of this material, thereby constituting a means to equalize this pressure substantially in the manner disclosed in co-pending application Ser. No. 275,284, filed March 7, 1952 by Michel N. Yardney and assigned to the assignee of the present application. Lead 22 emerging from electrode 20 may be round or flat and may or may not be in direct mechanical contact with some of the strip fragments 23. The thickness of electrode 20 is exaggerated in Fig. 4.

In Fig. 5 there is shown a battery casing 44 containing three negative electrodes 40 according to the invention, two positive electrodes 45, e. g. of sintered silver, alternating with the electrodes 40, and semi-permeable inter-electrode separators 46 comprising, for example, sheets of cellophane wrapped around the silver plates 45. An electrolyte 47, e. g. an aqueous solution of potassium hydroxide, permeates the assembly 40, 45, 46.

Each of the electrodes 40 comprises a horizontal spacer bar 48, which may be integral with its lead 42, from which depends a structure 43 of thin sheet material cut to form an array of slightly twisted vertical strips 43' hanging down from a solid portion 43''; sheet portion 43'' may be soldered to bar 48. It will be noted that the bar 48, whose width greatly exceeds that of the sheet 43'', by its presence between the elements 44, 45 results in the formation of electrolyte-filled chambers 41 receiving the structure 43, the strips 32' thereof serving to form channels within these chambers facilitating the circulation of electrolyte. The electrolyte 47 within each of the chambers 41 contains, in suspension, an amount of zinc and zinc compound particles not visible in the drawing but equivalent to the particles 11 and 21 of the preceding figures, these particles being present in an amount exceeding that which can be dissolved by the liquid; thus the content of each chamber 41 effectively forms part of the associated electrode 40.

The leads 42 from all the electrodes 40 merge in a single negative lead; similarly, leads 49 from all the electrodes 45 merge in a single positive lead.

Although the invention has been described with reference to certain embodiments, it is to be understood that the same may be adapted or modified in numerous ways without thereby departing from the scope of the appended claims.

I claim:

1. In an electric battery, in combination, a casing, an electrolyte in said casing, a first electrode of a material substantially insoluble in said electrolyte in said casing, a second electrode in said casing comprising a mass of solid particles of active material suspended in said electrolyte and a conductive metallic structure consisting essentially of an array of twisted metallic elements each connected to a common supporting conductive metallic member, the sum of the areas presented by all of said twisted elements being approximately equal to that of the entire area bounded by the peripheral points of the array immersed in said mass, and electrolyte-permeable separator means between said mass and said first electrode.

2. The combination according to claim 1, wherein said electrolyte is an alkaline solution and said mass contains zinc.

3. The combination according to claim 2, wherein said first electrode contains silver.

4. The combination according to claim 1, wherein said casing is provided with a compartment containing said mass and wherein said array of elements divides said compartment into channels for the circulation of said electrolyte.

References Cited in the file of this patent

UNITED STATES PATENTS

| | | |
|---|---|---|
| 460,235 | McDonald | Sept. 29, 1891 |
| 496,743 | DeMeriteus | May 2, 1893 |
| 669,007 | Eyanson et al. | Feb. 26, 1901 |
| 793,077 | Hubbell | June 27, 1905 |
| 912,242 | Hess | Feb. 9, 1909 |
| 1,196,611 | Tassin | Aug. 29, 1916 |
| 1,271,933 | Palmer | July 9, 1918 |
| 1,286,750 | Palmer | Dec. 3, 1918 |
| 2,594,709 | Andre | Apr. 29, 1952 |
| 2,594,711 | Andre | Apr. 29, 1952 |

FOREIGN PATENTS

| | | |
|---|---|---|
| 292,163 | France | Aug. 30, 1899 |